United States Patent [19]

Burr

[11] Patent Number: 4,671,368
[45] Date of Patent: * Jun. 9, 1987

[54] EARTH BORING BIT WITH SHEAR COMPRESSION SEAL

[75] Inventor: Bruce H. Burr, Houston, Tex.

[73] Assignee: Hughes Tool Company - USA, Houston, Tex.

[*] Notice: The portion of the term of this patent subsequent to May 14, 2002 has been disclaimed.

[21] Appl. No.: 814,343

[22] Filed: Dec. 27, 1985

Related U.S. Application Data

[63] Continuation-in-part of Ser. No. 733,435, May 13, 1985, which is a continuation-in-part of Ser. No. 542,801, Oct. 17, 1983, Pat. No. 4,516,641.

[51] Int. Cl.$^4$ ............................................. E21B 10/22
[52] U.S. Cl. ...................................... 175/371; 277/92; 384/94
[58] Field of Search ............. 175/359, 371; 277/81 R, 277/92, 95; 384/94

[56] References Cited

U.S. PATENT DOCUMENTS

| | | | |
|---|---|---|---|
| 2,590,759 | 3/1952 | Dale | 277/92 |
| 3,180,648 | 4/1965 | Kupfert et al. | 277/92 |
| 3,216,513 | 11/1965 | Robbins et al. | 175/227 |
| 3,403,916 | 10/1968 | Durham et al. | 277/92 |
| 3,524,654 | 8/1970 | Hasselbacher et al. | 277/92 |
| 3,656,764 | 4/1972 | Robinson | 277/92 |
| 3,982,595 | 9/1976 | Ott | 175/371 X |
| 4,077,634 | 3/1978 | Durham | 277/92 |
| 4,087,100 | 5/1978 | Yoshihashi et al. | 277/92 |
| 4,176,848 | 12/1979 | Lafuze | 277/92 |
| 4,189,159 | 2/1980 | Domes et al. | 277/95 X |
| 4,249,622 | 2/1981 | Dysart | 384/94 X |
| 4,421,327 | 12/1983 | Moreley et al. | 277/84 |
| 4,428,687 | 1/1984 | Zahradnik | 384/94 |
| 4,466,621 | 8/1984 | Garner et al. | 277/92 X |
| 4,466,622 | 8/1984 | Deane et al. | 277/92 |
| 4,516,641 | 5/1985 | Burr | 175/228 |

Primary Examiner—Stephen J. Novosad
Assistant Examiner—John F. Letchford
Attorney, Agent, or Firm—Robert A. Felsman

[57] ABSTRACT

An earth boring bit having a lubrication system that includes a pressure compensator and seals to confine lubricant within the bearings between rotatable cutters and shafts, the seals being of the asymmetrical shear-/compression type, each half of which having a load deflection curve resulting from components satisfying the following criteria:

$$D_H > A_p S$$

and $$D_C > A_p S[(S-1)/S]^{\frac{1}{2}}$$

Where:
  $D_H$ = Assembly deflection of shaft seal ring with bearing thrust faces in contact (in.);
  $D_C$ = Assembly deflection of cutter seal ring with bearing thrust faces in contact (in.);
  $A_p$ = Axial cutter play (in.);
  S = Ratio seal to cutter movement.

Also preferably, $D_C \approx D_H[(S-1)/S]^{\frac{1}{2}}$.

4 Claims, 2 Drawing Figures ated into U.S. Pat. No. 4,516,641, Earth Boring Bit
EARTH BORING BIT WITH SHEAR COMPRESSION SEAL

CROSS REFERENCE TO RELATED APPLICATION

This invention is related to, and is a continuation-in-part of, a previous application: "Earth Boring Bit With Improved Rigid Face Seal Assembly", Ser. No. 733,435, filed May 13, 1985, which is a continuation-in-part of application Ser. No. 542,801 filed Oct. 17, 1983 matured into U.S. Pat. No. 4,516,641, Earth Boring Bit With Pressure Compensating Rigid Face Seal, May 14, 1985.

BACKGROUND OF THE INVENTION

1. Field of the Invention

This invention relates to earth boring bits, lubricated with a system which includes a hydrostatic pressure compensator to balance the internal pressure of the lubricant inside the bit with the hydrostatic pressure of a liquid drilling fluid that surrounds the bit during drilling. In this combination the specific improvement relates to the seal assembly between each cutter and bearing shaft which confines lubricant within, and excludes contaminates from, the bearing and lubrication system.

2. Description of the Prior Art

The successful application of rigid (usually metal) face seals in the harsh environment, including severe pressure fluctuations, found during the drilling of deep wells for petroleum and minerals culminated in the structures disclosed in my above identified U.S. Pat. No. 4,516,641. In this patent the preferred embodiment may be referred to as the "roll/compression" metal face seal.

There is another class of seals known as the "shear/compression" metal face seal, one example of which may be seen in U.S. Pat. No. 4,421,327, "Heavy Duty End Face Seal With Asymmetrical Cross-Section", Dec. 20, 1983. An example of an attempt to apply the shear/compression seal to earth boring bits may be seen in U.S. Pat. No. 4,466,622, Compound Dynamic Seal For Rolling Cutter Drill Bit, Aug. 21, 1984.

SUMMARY OF THE INVENTION

It is the general object of this invention to improve the performance of the rigid face seal in an earth boring bit by modification to especially the asymmetrical type.

The above and other objects are achieved by the provision of asymmetrical type metal face seal halfs with configurations satisfying the following criteria:

$$D_H > A_p S$$

and $$D_C > A_p S[(S-1)/S]^{\frac{1}{2}}$$

Where:

$D_H$ = Assembly deflection of shaft seal ring with bearing thrust faces in contact (in.);
$D_C$ = Assembly deflection of cutter seal ring with bearing thrust faces in contact (in.);
$A_p$ = Axial cutter play (in.);
$S$ = Ratio seal to cutter movement.

Preferably in addition to the above criteria the construction of the seal component halfs is such that:

$$D_C \simeq D_H[(S-1)/S]^{\frac{1}{2}}$$

The above as well as additional objects, features, and advantages of the invention will become apparent in the following detailed description.

DESCRIPTION OF THE PREFERRED EMBODIMENT

Figure 1:
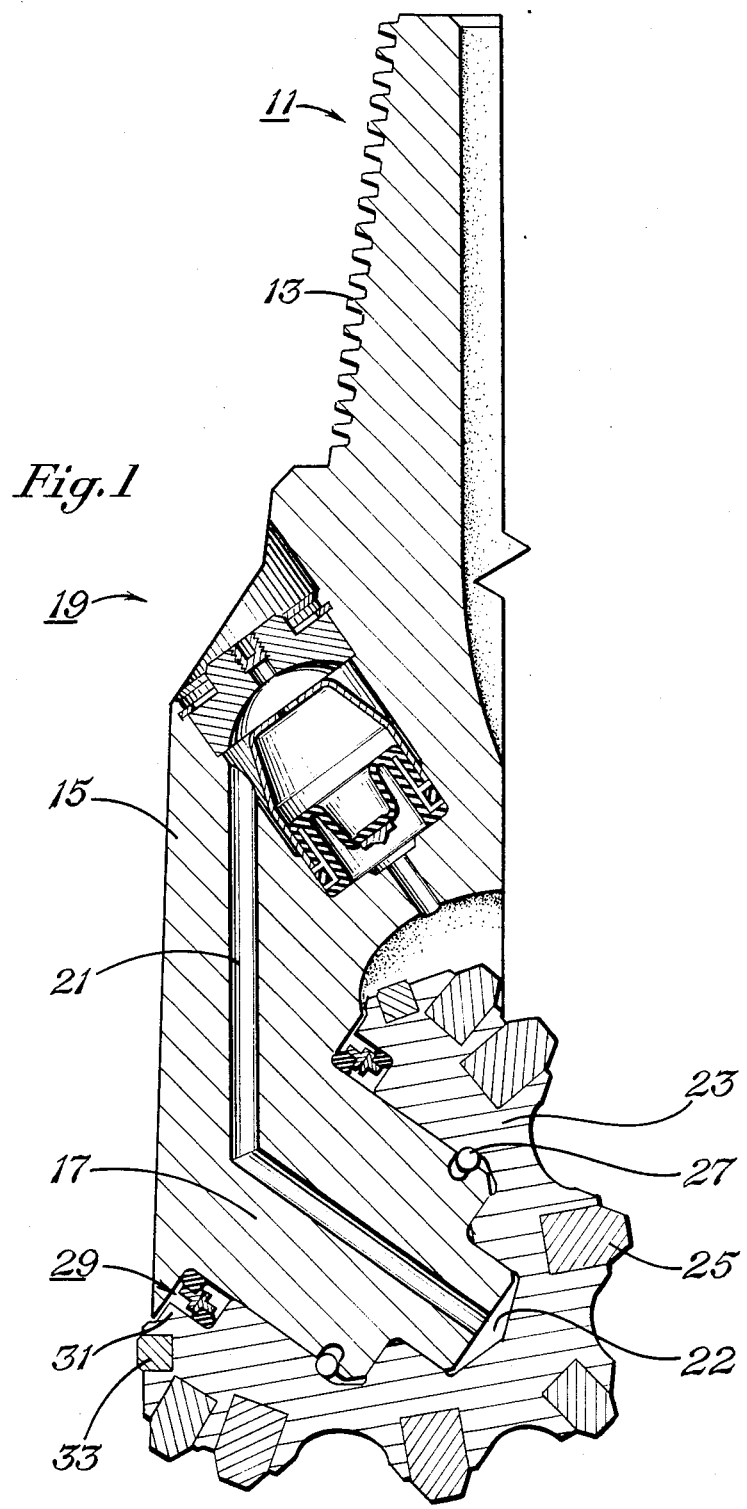
FIG. 1 is a longitudinal section of one third of an earth boring drill bit, disclosing an asymmetrical seal of the shear/compression type used to seal lubricant between the rotatable cutter and shaft of an earth boring bit.

In numeral 11 the drawing designates an earth boring drill bit with a threaded upper end 13 and a leg 15 which supports an obliquely and downwardly oriented, cantilevered bearing shaft 17. The leg includes a pressure compensating system 19 of the type that may be seen with reference to the patent to Stuart C. Millsapps, Jr., U.S. Pat. No. 4,276,946.

A series of lubricant passages 21 assure the presence of a lubricant in all spaces, such as 22, in the bearing area between the rotatable cutter 23 and the bearing shaft 17.

The cutter has a plurality of earth disintegrating teeth 25, which in this instance are sintered tungsten carbide, retained by interference fit in mating holes in the cutter 23.

Retaining the cutter 23 on the bearing shaft 17 is a snap ring retainer 27 which may be the type seen with reference to the patent to Edward M. Galle, U.S. Pat. No. 4,236,764.

Figure 2:
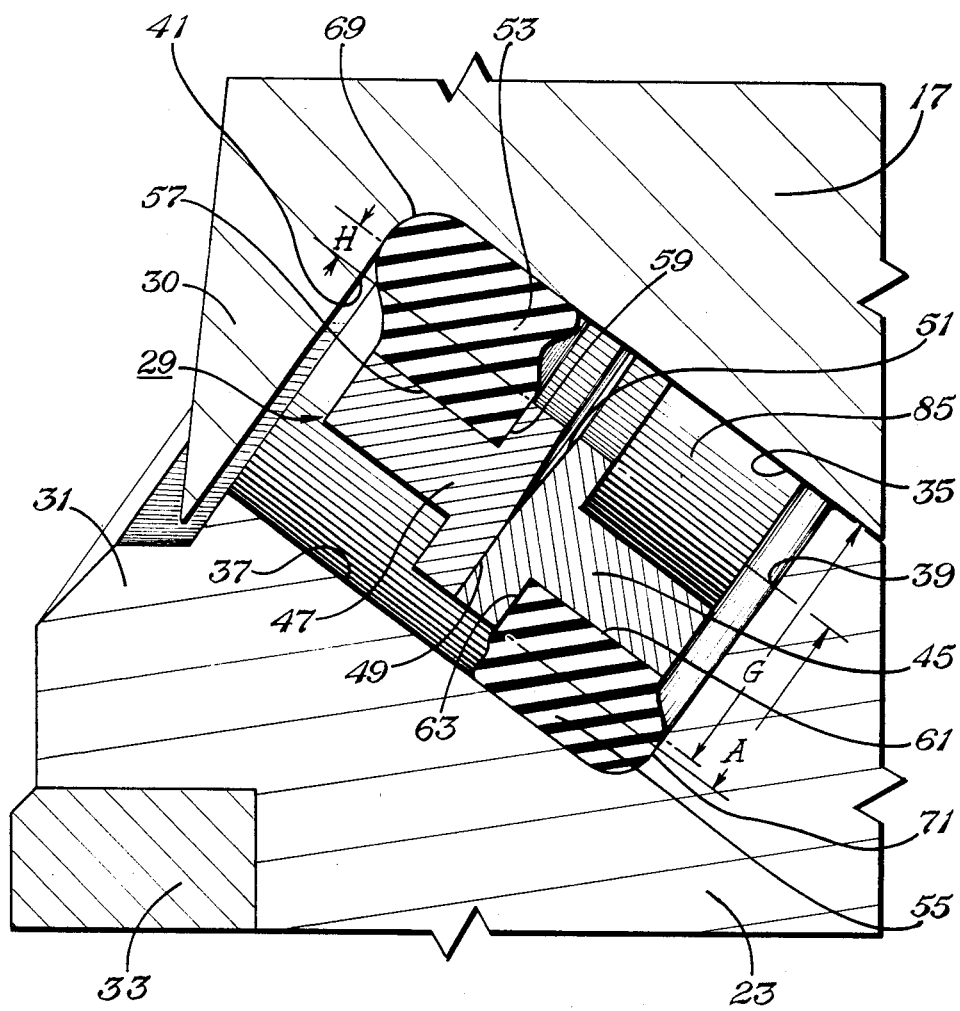
FIG. 2 is an enlarged and fragmentary view of the seal assembly shown in FIG. 1.

To retain lubricant between the bearing surfaces of the cutter 23 and the shaft 17 there is an asymmetrical shear/compression seal 29, which may be better seen with reference to FIG. 2.

In FIG. 2 there is an enlarged portion of the bearing shaft 17, with its characteristics shirttail 30, which extends over the shear/compression seal 29 and over a small portion of the mouth section 31 of the cutter 23. A gage reaming insert 33 in the cutter 23 is shown in FIG. 1, a portion being visible in FIG. 2.

The shear/compression seal 29 is disposed in a groove having a pair of oppositely facing circumferential walls 35, 37, one formed in the bearing shaft 17 and the other formed in the cutter 23. Further, there are a pair of oppositely facing, inner and outer radial end walls 39, 41, one formed in cutter 23 and the other in the shirttail portion 30 of the shaft.

Suspended within the above defined seal groove are a pair of rigid, inner and outer metal rings 45, 47 having opposed sealing faces 49 and a lubricant space 51. Associated with each rigid ring is an energizer ring 53, 55, one sealing against the shaft 17 and the other against the cutter 23. The energizer rings engage by nonslipping interference fit a respective pair of surfaces 57,59 or 61,63 of an outer (or shaft) rigid ring 47 and an inner (or cutter) rigid ring 45.

Further, each energizer ring has a curved portion 69 or 71 that engages a portion of the radial wall 41 or 39, the circumferential wall 35 or 37, and the mating radius. The interference or radial compression between the energizer rings 53,55 and the opposed seating surfaces prevents slippage.

There is an axial, minimum clearance between the rigid rings 45, 47 and the radial end walls 39, 41. Reference should be made to the teachings of my U.S. Pat. No. 4,516,641.

It should be noted that the differences in the cross sectional sizes and dimensions of the energizer rings 53, 55 is such that each half (one energizer ring and associated rigid ring) of the seal assembly is asymmetrical with respect to the other. Specifically, the energizer ring 55 is smaller in radial dimension and stiffer than the energizer ring 53.

In order to determine the sizes and physical characteristics of the energizer rings it is not sufficient to analyze the typical load deflection curve, which is a measurement of the face load on the whole seal assembly with varying axial deflections. I have discovered that it is necessary to examine the individual load deflection curve for each seal half.

A successful seal assembly will not be produced unless the following conditions are obtained:

$$D_H > A_p S$$

and $$D_C > A_p S [(S-1)/S]^{\frac{1}{2}}$$

Where:
$D_H$ = Assembly deflection of shaft seal ring with bearing thrust faces in contact (in.);
$D_C$ = Assembly deflection of cutter seal ring with bearing thrust faces in contact (in.);
$A_p$ = Axial cutter play (in.);
S = Ratio seal to cutter movement.

In the preferred embodiment, in addition to the above criteria, the relationship between $D_H$ and $D_C$ is obtained when:

$$D_C \simeq D_H [(S-1)/S]^{\frac{1}{2}}$$

As described in my U.S. Pat. No. 4,516,641, a face seal of the type disclosed here must be able to provide dynamic pressure compensation during drilling. Cutter movements during drilling, caused by the complex forces applied to the cutter, and the clearances which are of necessity used to enable assembly of the parts, produce rapid changes in the volume defined by space 85. The viscosity of the lubricant and flow restrictions between the space 85 and the pressure compensator 19 do not allow compensation for the volume changes in space 85 as rapidly as they occur. Thus axial seal assembly movement takes place during drilling to provide the required compensation. Seal assembly design and axial clearances determine whether this axial movement will be detrimental to seal assembly life and thus bit life.

In the roll/compression type seals described in U.S. Pat. No. 4,516,641, the elastomer energizers maintain a good "grip" on both the rigid seal rings and the seal recess surfaces regardless of seal position. This is due to the radial compression of the O-ring type energizer even prior to any assembly deflection. In shear/compression type seals, as described in this application, there is no radial energizer compression without axial deflection of both seal halves. Thus, without axial deflection of each seal half there is no energizer "grip" on seal recess surfaces and rigid rings. If this loss of "grip" occurs, axial and circumferential slippage of the energizer with respect to the seal recess or rigid ring can take place with resulting seal failure or reduction in seal life.

Sear/compression type seals for use in rock bits must be designed so that the axial compensating seal movement that occurs during drilling does not result in axial or circumferential energizer slippage. This is done by ensuring that axial assembly deflection of each seal half is greater than the maximum anticipated axial movement of each seal half out of its seat during the seal assembly's compensating motion. Maximum cutter and seal motion are determined by the axial cutter play and the ratio of seal movement to cutter movement.

If the assembly deflection of the shaft real ring $D_H$ is greater than the axial cutter play $A_p$ times the ratio of seal assembly movement to cutter movement S there will be radial compression of the shaft energizer at all times during drilling. If the assembly deflection of the cutter seal ring $D_C$ is greater than the axial cutter play $A_p$ times the ratio of seal movement to cutter movement S times the quantity $[(S-1)/S]^{\frac{1}{2}}$ then radial compression of the cutter energizer will be maintained during drilling. Further, the seal assembly design can be optimized to take best advantage of the limited space in a rock bit seal recess and minimize the variations of face loading during operation. This is accomplished if the seal assembly is designed such that the assembly deflections of each half are related as follows:

$$D_C \simeq D_H [(S-1)/S]^{\frac{1}{2}}$$

To achieve the above relationships in the preferred embodiment, the load deflection curve for the shaft seal half, energizer 53 and rigid ring 47 should produce a face load varying between forty and seventy-two pounds for axial deflection ranging between 0.048 and 0.087 inch. For the same face load variation the cutter seal half, energizer 55 and rigid ring 45 should have axial deflections ranging between 0.023 and 0.42 inch. It is assumed that the axial play $A_p$ of the cutter on the shaft is about 0.020 inch and the ratio of seal movement to cutter movement S is about 1.31 to 1. This ratio is estimated by using the formula disclosed in my copending application, Ser. No. 733,455 filed May 13, 1985, shown again here and referring to the dimensions from FIG. 2:

$$S = \frac{2G - C}{H + C + 2A}$$

Where:
S = Ratio of Seal Movement to Unit Cutter Movement Relative to the shaft
H = 0.323 in² (Effective Head Energizer Annular Area)
C = 0.0 (Effective Cutter Energizer Annular Area)
A = 1.807 in² (Effective Rigid Ring Annular Area)
G = 2.573 in² (Effective Seal Groove Annular Area)

The annular areas H, A and G were calculated for a bit with a shaft 17 diameter of 2.970 inch and a cutter seal recess surface 37 diameter of 3.604 inch for the seal assembly shown in FIG. 2. Energizer ring geometry similar to that in FIG. 2, using an elastomer with about fifty-five durometer hardness, should yield the load deflection data previously given. The face loads for given deflections may be varied by adjusting the durometer hardness of the elastomer.

The use of shear/compression face seals under atmospheric conditions requires only that the total assembly deflection of the seal be greater than any anticipated end play. This ensures that the energizers never totally relax and maintain not only face load but also "grip" on the seal seats to prevent energizer slippage and seal leakage.

With the introduction of high hydrostatic pressure and the cantilever bearing geometry of a rock bit, the abve described requirement becomes insufficient to ensure that the energizers never totally relax. As described earlier in this specification, it then becomes necessary to require that each seal half undergo an assembly deflection that is greater than a value defined by the axial play and the ratio of seal to cutter movement, and that value is different for each seal half. If these requirements are not met, then axial and circumferential energizer slippage can take place when an energizer becomes totally relaxed. The total relaxation of an energizer, even if only momentary, not only allows slippage, but, due to loss of contact pressure between the elastomer and its seat, will allow intrusion of contaminates into the bearing. The result will be early seal and bearing failure of the rock bit.

While the invention has been described in only one of its forms, it should be apparent to those skilled in the art that it is not thus limited, but is susceptible to various changes and modifications without departing from the spirit thereof.

I claim:

1. In an earth boring bit of the type having at least one rotatable cutter sealingly secured to a cantilevered bearing shaft, lubricated with a pressure compensated lubrication system, the improvement which comprises:
   a body;
   a cantilevered bearing shaft extending obliquely inwardly and downwardly from the body;
   a cutter secured for rotation about the bearing shaft, with axial and radial play due to clearances;
   a lubrication system in the body, including a hydrostatic pressure compensator;
   a seal groove including a pair of oppositely facing circumferential walls, one located on the cutter and the other on the bearing shaft, each of which intersects a generally radial end wall;
   a pair of rigid rings positioned in the seal groove to have opposed, sealing faces;
   a pair of inner and outer resilient, shear/compression energizer rings, having respectively an inner or an outer annular surface sealingly opposing a respective circumferential wall of the seal groove, with an opposite inner or outer annular surface sealingly opposing a rigid ring;
   the rigid rings being positioned intermediate the end walls of the groove during assembly of the cutter on the bearing shaft and exposed to and moved axially by the dynamic pressure differentials between the lubricant and the ambient drilling fluid;
   the axial width of the engaged rigid rings being less than the axial, minimum width of the seal groove when the cutter is thrust outwardly on the bearing shaft to define at least one axial clearance to permit unrestricted axial movement of the rigid rings between the end walls of the groove when the cutter moves relative to the bearing shaft;
   each seal assembly half having energizer rings with load deflection curves wherein:

$$D_H > A_p S$$

and $$D_C > A_p S[(S-1)/S]^{\frac{1}{2}}$$

Where:
$D_H$ = Assembly deflection of shaft seal ring with bearing thrust faces in contact (in.);
$D_C$ = Assembly deflection of cutter seal ring with bearing thrust faces in contact (in.);
$A_p$ = Axial cutter play (in.);
$S$ = Ratio seal to cutter movement.

2. The invention defined by claim 1 wherein there is a clearance between each rigid and the opposed radial wall of the groove, and the inner energizer ring has greater rigidity than the outer energizer ring.

3. The invention defined by claim 1 wherein:

$$D_C \simeq D_H[(S-1)/S]^{\frac{1}{2}}$$

4. The invention defined by claim 3 wherein there is a clearance between each rigid ring and the opposed radial wall of the groove, and the inner energizer ring has greater rigidity than the outer energizer ring.

* * * * *